United States Patent [19]

Kraus

[11] Patent Number: 4,709,589
[45] Date of Patent: Dec. 1, 1987

[54] FIXED RATIO TRACTION ROLLER TRANSMISSION

[75] Inventor: Charles E. Kraus, Austin, Tex.

[73] Assignee: Excclermatic Inc., Austin, Tex.

[21] Appl. No.: 896,106

[22] Filed: Aug. 13, 1986

[51] Int. Cl.$^4$ .................. F16H 13/06; F16H 13/02
[52] U.S. Cl. .......................... 74/206; 74/209; 74/798; 411/369
[58] Field of Search .............. 74/202, 206, 209, 798; 411/368, 369, 544

[56] References Cited

U.S. PATENT DOCUMENTS

| | | | |
|---|---|---|---|
| 1,106,246 | 8/1914 | Schoedelin | 74/206 |
| 2,778,227 | 7/1953 | Roesch | 74/209 |
| 3,380,312 | 4/1968 | Barske | 74/206 |
| 3,776,051 | 12/1973 | Kraus | 74/208 |
| 3,848,476 | 11/1974 | Kraus | 74/798 |
| 3,941,004 | 3/1976 | Kraus | 74/798 |
| 3,945,270 | 3/1976 | Nelson et al. | 74/206 |
| 4,408,503 | 10/1983 | Kraus | 74/206 |
| 4,440,043 | 4/1984 | Kraus | 74/202 |
| 4,471,667 | 9/1984 | Kraus | 74/206 |
| 4,491,038 | 1/1985 | Kraus | 74/209 |

Primary Examiner—Lawrence Staab
Assistant Examiner—Joseph J. Meter

[57] ABSTRACT

In a fixed ratio planetary-type traction roller transmission wherein planetary traction rollers are disposed in the annular space between, and in engagement with, a traction ring and a central sun roller for the transmission of motion therebetween, the planetary traction rollers have smooth side faces and are supported between, and guided by, a mounting plate structure at one side and a guide plate at the opposite side both having planar areas adjacent the traction roller side faces and being urged toward one another for retaining the traction rollers therebetween in parallel alignment.

7 Claims, 3 Drawing Figures

FIXED RATIO TRACTION ROLLER TRANSMISSION

BACKGROUND OF THE INVENTION

The invention relates to fixed ratio planetary type traction roller transmissions.

In traction roller transmission relatively large surface pressures are required for the transmission of forces between the rollers which are in engagement with one another. Depending on the torque transmitted, there are also substantial tangential forces which are effective at the surfaces of the rollers along their lines of contact with adjacent roller or ring surfaces, the maximum tangential forces occurring just before slipping. However, large forces are also effective in axial direction of the traction rollers along their lines of contact with other rollers or the ring surface if the axes of the rollers or the traction ring are not perfectly parallel to one another. In fact, the axial forces caused by misalignment of two rollers which are in engagment with one another are about equal the maximum tangential forces at a given transmission torque. It is therefore important that the traction roller transmission include means which guide the rollers into proper alignment or that the rollers are accurately supported so as to be in proper parallel alignment. Both require relatively expensive and accurately mounted guide or support structures as evident for example from applicant's earlier U.S. Pat. Nos. 3,941,004 or 4,491,038.

SUMMARY OF THE INVENTION

In the traction roller transmission according to the invention in which planetary traction rollers are disposed int he annular space between a traction ring and a central sun roller with which they are firmly engaged for the transmission of motion therebetween, the planetary traction rollers have smooth planar side faces and are supported and guided by a mounting plate structure at one side and a guide plate at the opposite side, both the mounting plate structure and the guide plate having planar areas adjacent the traction roller side faces and being provided with means for forcing them toward one another thereby retaining the traction rollers therebetween in parallel alignment.

Preferably, the traction rollers have all the same axial length and the planar areas of each of the guide plate and of the mounting plate structure are in the same respective planes so that the planar area can be easily manufactured. In any case, parallel alignment of the rollers is safely maintained as a single plate forms the side guide structure at each side of the rollers.

SHORT DESCRIPTION OF THE DRAWINGS

DESCRIPTION OF THE PREFERRED EMBODIMENT

Figure 1:
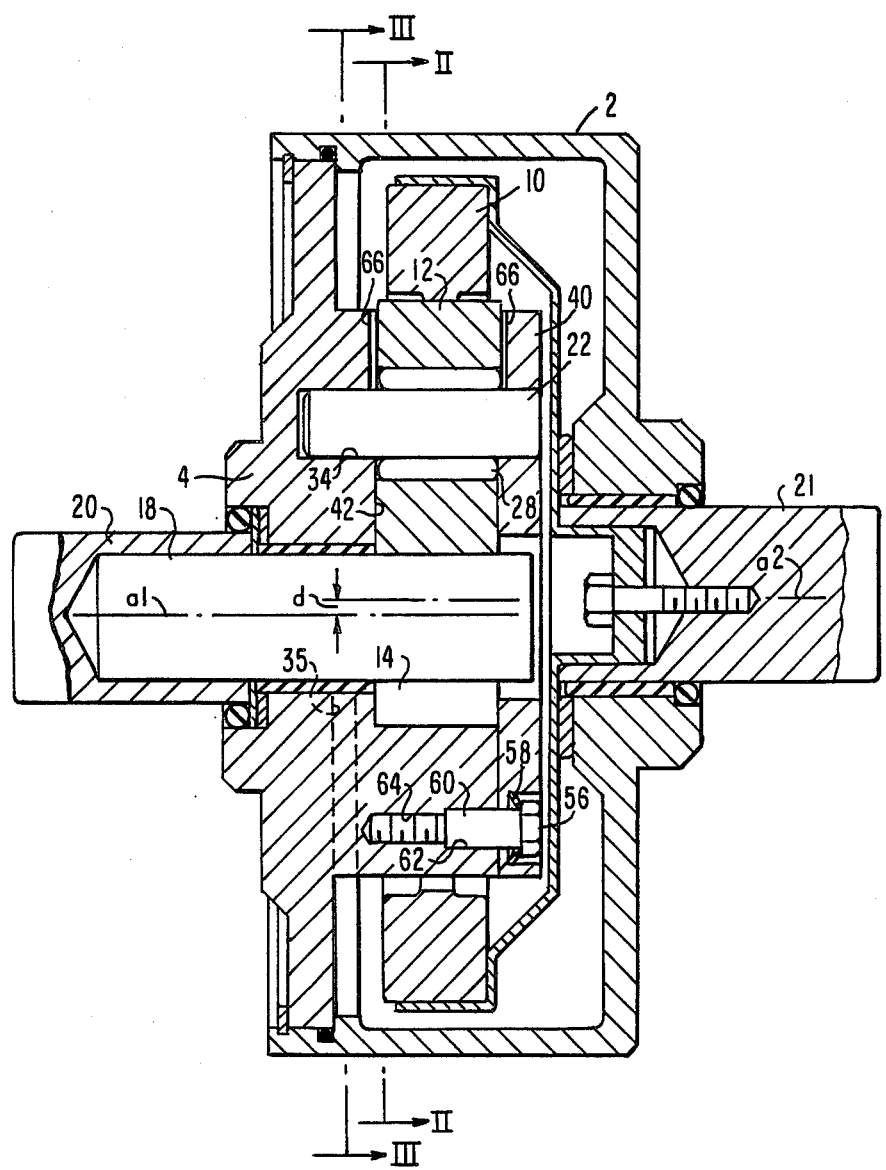
FIG. 1 shows schematically the preferred arrangement of the invention wherein three traction rollers are disposed in the space between the sun roller and the traction ring.
Figure 2:
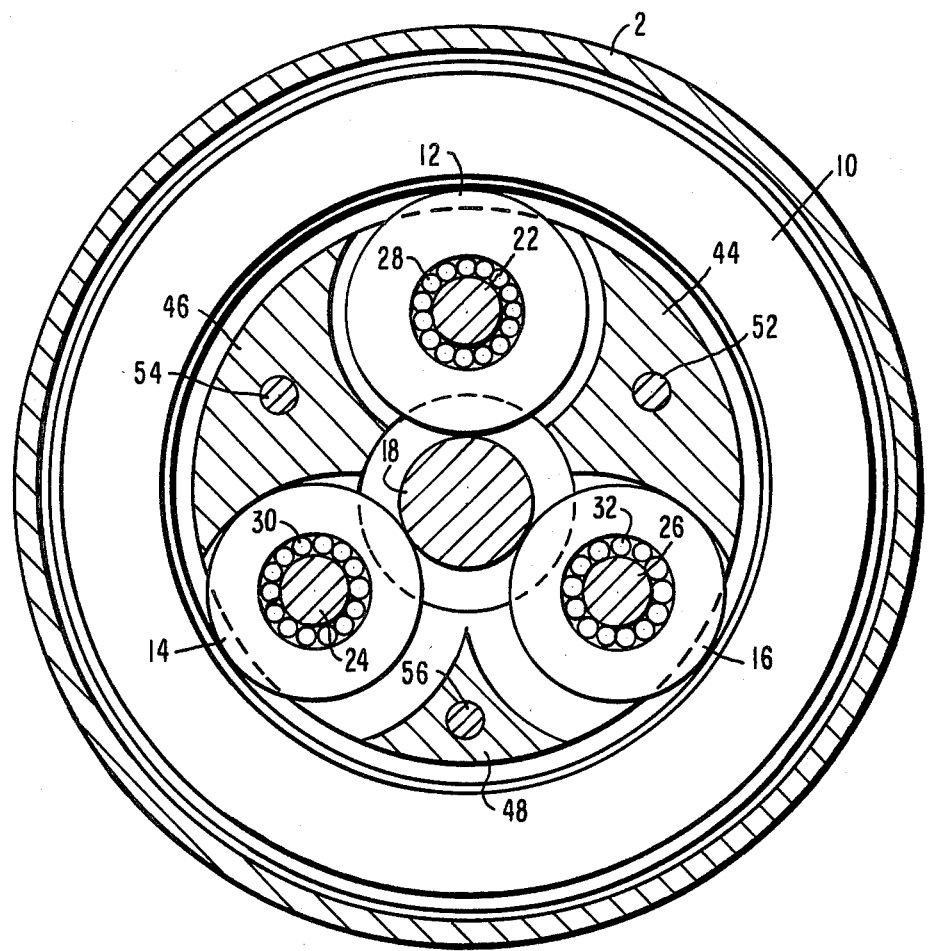
FIG. 2 is a cross-sectional view along line II—II of FIG. 1.
Figure 3:
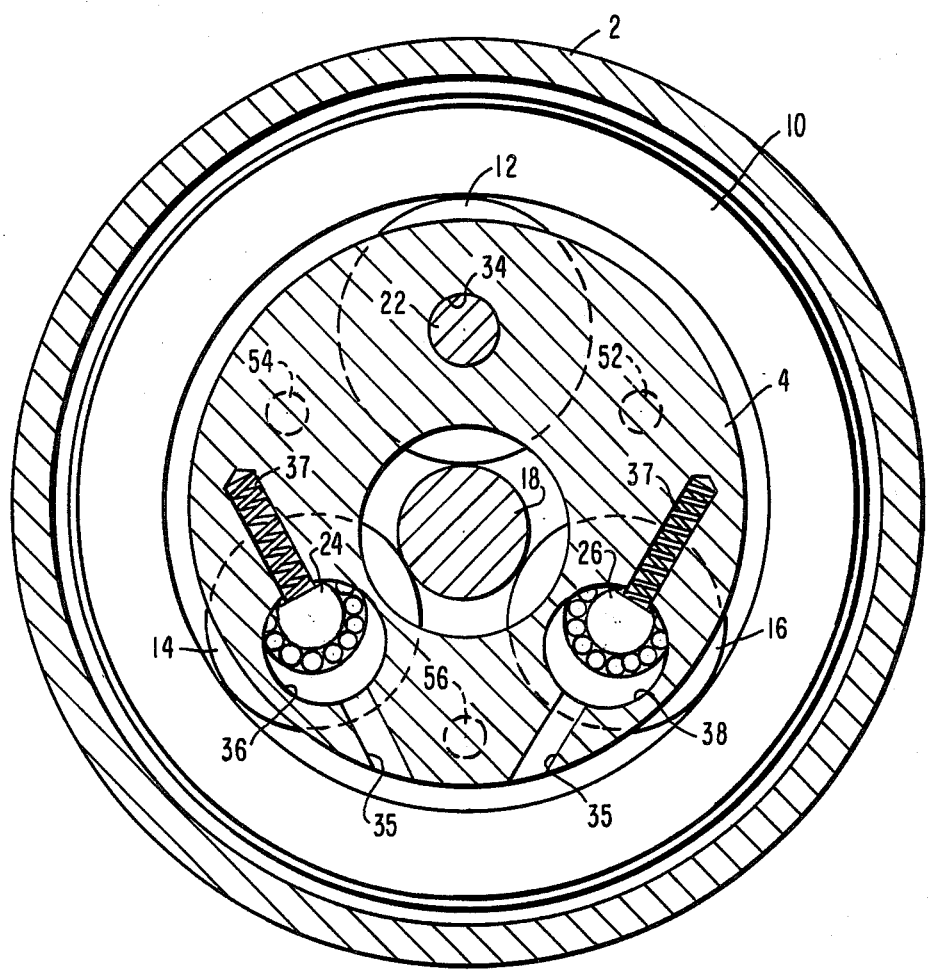
FIG. 3 is a cross-sectional view along line III—III of FIG. 1.

In a planetary type traction roller transmission as shown in FIG. 1 a traction ring 10 disposed in a housing 2 with housing cover or mounting plate structure 4 surrounds three traction rollers 12, 14, 16 engaging therebetween a sun roller 18 for the transmission of power betwen the traction ring 10 and the sun roller 18. The sun roller 18 is mounted on, or is, the end of an input shaft 20 and the traction ring 10 is mounted on an output shaft 21 if the transmission is used as a speed reducer. In the wedge-type planetary transmission shown in FIG. 1, the axes a1, a2 of the sun roller 18 and the traction ring 10 are parallel to, but displaced from, each other by a distance d, so that between the traction ring 10 and the sun roller 18 an annular path of varying width is formed. The rollers 12, 14 and 16 are all rotatably supported on shafts 22, 24, 26. Roller 12 is disposed in the widest path area and the rollers 14 and 16 are disposed in the narrowing path areas. All rollers are supported on shafts 22, 24, 26 by bearings 28, 30, 32. The shafts extend into shaft receiving openings 34, 36, 38 in the mounting plate structure 4 and corresponding openings formed in an alignment plate 40. The shaft 22 of the largest roller 12 is firmly supported in position between the housing cover 4 and the plate 40. However the shaft openings 36 and 38 are large enough to provide for the rollers 14 and 16 freedom of movement to permit their wedging into the narrowing space between the sun roller 18 and the traction ring 10 for firm engagment of the rollers 12, 14, 16 with the sun roller 18 and the traction ring 10.

There are provided in the support plate structure 4 bores 35 which extend essentially through the axis of the shaft openings 36 and 38 and tangential to a circle having a center coincident with the sun's axis and which receive springs 37 bearing against the shafts 24 and 26 for urging the rollers 14 and 16 into the narrowing annular space between the sun roller 18 and the traction ring 10 in order to insure engagement of the traction rollers with the sun roller and the traction ring at all times.

In order to provide for accurate alignment of the traction rollers 12, 14 and 16 they have all the same width and are provided with accurately ground side surfaces. Also, the surface areas 42 of the housing cover 4 adjacent to the rollers 12, 14 and 16 are smoothly ground such that they are disposed in a common plane. Between the rollers 12, 14 and 16 the housing cover 4 has projections 44, 46, 48 of a length corresponding to the width of the rollers 12, 14, 16 on which the roller alignment plate 40 is mounted by bolts 52, 54, 56. The roller alignment plate 40 is forced against the cover projections 44, 46, 48 with a predetermined force as provided by the Belleville springs 58 disposed in a space between the heads of the bolts 52, 54, 56 and the alignment plate 40. In order to insure the desired force of engagement the bolts have shouldered portions 60 of a given length which are disposed in recesses 62 in the threaded bore 64. It may be noted that it is important that there is one single alignment plate for all the traction rollers together as this insures proper alignment to a much greater degree than would alignment structures which are separate for each one of the rollers. Although this requires high manufacturing accuracies such accuracies can be easily maintained since the structure is relatively simple. There are also provided oil grooves 66 in the alignment plate and the support plate structure adjacent the rollers in order to cause lubricant to enter between the guide surfaces and the roller side surfaces.

The transmission as described requires only relatively little space for the amount of power it is capable to transmit. It also has been found to be quite reliable and quiet in operation; and it is simple and easy to manufacture.

However the invention is of course not limited to a three roller wedge-type arrangement. It may just as well be utilized with transmission utilizing other types of torque dependent roller engagment means or transmissions with accurately manufactured preloaded engagment structures.

What is claimed is:

1. A fixed ratio planetary type traction roller transmission having input and output shafts and comprising a mounting plate structure through which one of said shafts extends, said one shaft carrying a sun roller, a traction ring carried by the other of said shafts for rotation therewith, said sun roller being arranged within said traction ring such that an annular space is formed between said sun roller and said traction ring, a number of motion transmitting traction rollers supported in said annular space so as to be in engagement with said sun roller and said traction ring for transmitting motion therebetween, a roller alignment plate arranged opposite said mounting plate structure with said traction rollers disposed therebetween, support projections extending through said annular space between said mounting plate structure and said alignment plate in the areas between said traction rollers, said traction rollers having smooth planar side faces and said support plate structure and said alignment plate having smooth planar parallel surfaces adjacent said traction rollers, and means associated with said support projections, said mounting plate structure and said alignment plate for resiliently urging said alignment plate and said mounting plate structure toward one another with a predetermined force thereby urging their smooth planar surfaces adjacent said traction rollers into guiding abutment with the traction rollers side faces to provide for parallel orientation of said traction rollers.

2. A traction roller transmission according to claim 1, wherein all traction rollers have the same axial length and the smooth planar surfaces of the mounting plate structure are all disposed in a first single plane and those of the alignment plate are all disposed in another plane spaced from said first plane with the traction rollers guided between the two spaced planes.

3. A traction roller transmission according to claim 1, wherein said support projections are integral with said support plate structure and said alignment plate is mounted on said support projections by bolts including said means providing for a predetermined force for urging said alignment plate toward said support plate structure.

4. A traction roller transmission according to claim 3, wherein each of said bolts has a shoulder seated in said support projections and a head spaced from the adjacent surface of said alignment plate a given distance and wherein a Belleville spring is disposed between said bolt head and said alignment plate so as to provide said predetermined force.

5. A traction roller transmission according to claim 1, wherein grooves are formed in the surfaces of said alignment plate and said support plate structure adjacent the roller side faces for supplying lubricant to said surfaces.

6. A traction roller transmission according to claim 1, wherein said sun roller is arranged in said traction ring with its axis parallel to, but displaced from, the axis of said traction ring thereby to form an annular path of varying width between said sun roller and said traction ring, and wherein at least one of the traction rollers is so supported as to be movable within said annular space and has a shaft portion extending into an opening in at least one of the adjacent mounting plate structure and alignment plate and means are provided in said opening bearing against said shaft portion for urging said traction roller into the narrowing space between said sun roller and said traction ring to insure engagement of the traction rollers with the sun roller and the traction ring.

7. A traction roller transmission according to claim 6, wherein at least said one of said mounting plate structure and said alignment plate is provided with a bore extending essentially through the axis of said shaft portion receiving opening and tangential to a circle having a center essentially coinicident with the roller's axis and passing through the axis of the shaft-receiving opening, each bore receiving a spring bearing against the respective shaft portion for urging the associated roller into the narrowing annular space between the sun roller and the traction ring.

* * * * *